United States Patent [19]
Yamasaki et al.

[11] Patent Number: 5,989,479
[45] Date of Patent: *Nov. 23, 1999

[54] METHOD FOR MANUFACTURING AN AIR BAG COVER

[75] Inventors: Chiho Yamasaki, Aichi; Chiharu Totani, Gifu; Shigehiro Ueno, Aichi; Hisao Hanabusa, Aichi; Akiyoshi Nagano, Aichi; Tetsuya Fujii, Aichi; Katsuhiro Katagiri; Kenichi Furuta, both of Gifu; Yoshio Yamazaki, Mie, all of Japan

[73] Assignee: Toyoda Gosei Co., Ltd., Aichi-ken, Japan

[ * ] Notice: This patent is subject to a terminal disclaimer.

[21] Appl. No.: 08/897,695

[22] Filed: Jul. 21, 1997

Related U.S. Application Data

[62] Division of application No. 08/667,920, Jun. 20, 1996, Pat. No. 5,698,283.

[30] Foreign Application Priority Data

| Jun. 21, 1995 | [JP] | Japan | 7-154884 |
| Jun. 21, 1995 | [JP] | Japan | 7-154897 |
| Jun. 21, 1995 | [JP] | Japan | 7-154911 |
| Jul. 31, 1995 | [JP] | Japan | 7-194970 |
| Aug. 11, 1995 | [JP] | Japan | 7-205657 |

[51] Int. Cl.⁶ ............ B29C 45/14; B29C 51/10
[52] U.S. Cl. ............ 264/510; 264/513; 264/554; 264/255; 264/267; 264/154; 264/443; 264/479; 264/490
[58] Field of Search .......... 264/510, 554, 264/259, 296, 46.8, 154, 255, 267, 443, 479, 490, 513

[56] References Cited

U.S. PATENT DOCUMENTS

| 4,917,903 | 4/1990 | Mente ............ 264/296 |
| 5,180,187 | 1/1993 | Muller et al. ............ 280/732 |
| 5,194,194 | 3/1993 | Kato et al. ............ 264/510 |
| 5,248,532 | 9/1993 | Sawada et al. . |
| 5,316,822 | 5/1994 | Nishijima et al. ............ 264/297.2 |
| 5,335,935 | 8/1994 | Proos et al. . |
| 5,395,668 | 3/1995 | Ito et al. . |
| 5,599,608 | 2/1997 | Yamamoto et al. ............ 264/510 |
| 5,632,914 | 5/1997 | Hagenow et al. ............ 219/121.71 |
| 5,650,115 | 7/1997 | Proos et al. ............ 264/400 |
| 5,756,189 | 5/1998 | Nagano et al. ............ 428/198 |

FOREIGN PATENT DOCUMENTS

| 2703012 | 9/1994 | France ............ 280/728.3 |
| 63-22262 | 2/1988 | Japan . |
| 2-248238 | 10/1990 | Japan . |
| 4-151345 | 5/1992 | Japan . |
| 6-218811 | 8/1994 | Japan . |

OTHER PUBLICATIONS

Frados, Joel; Plastic Engineering Handbook, 4th ed, pp. 68–71, 1976.

*Primary Examiner*—Jan H. Silbaugh
*Assistant Examiner*—Edmund H. Lee
*Attorney, Agent, or Firm*—Pillsbury Madison & Sutro LLP

[57] ABSTRACT

An air bag cover and manufacturing method thereof wherein the air bag cover comprises a core member which can be formed by injection molding, and a decorative sheet disposed on the surface of the core member. The decorative sheet includes at least two layers, an outer layer and a barrier layer disposed on a back side of the outer layer to protect the outer layer when the core member is injection molded. The core member is made of thermoplastic elastomer which can be thermally fused to the barrier layer. A breakable portion is provided in the barrier layer and core member.

11 Claims, 9 Drawing Sheets

Fig. 4(a)
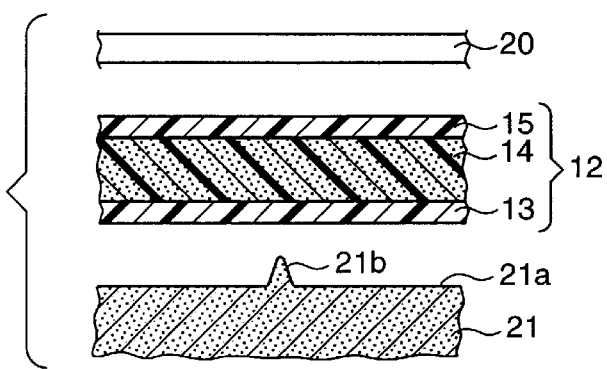
Fig. 4(b)
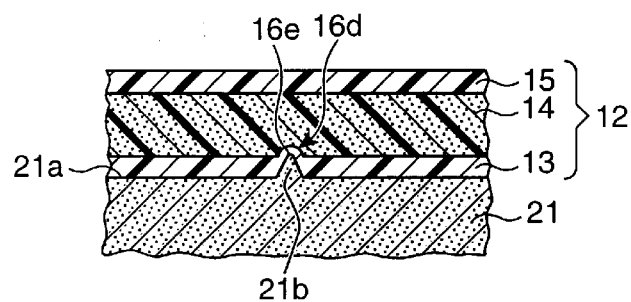
Fig. 4(d)
Fig. 4(c)
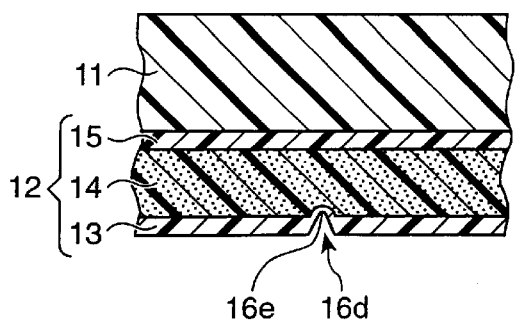
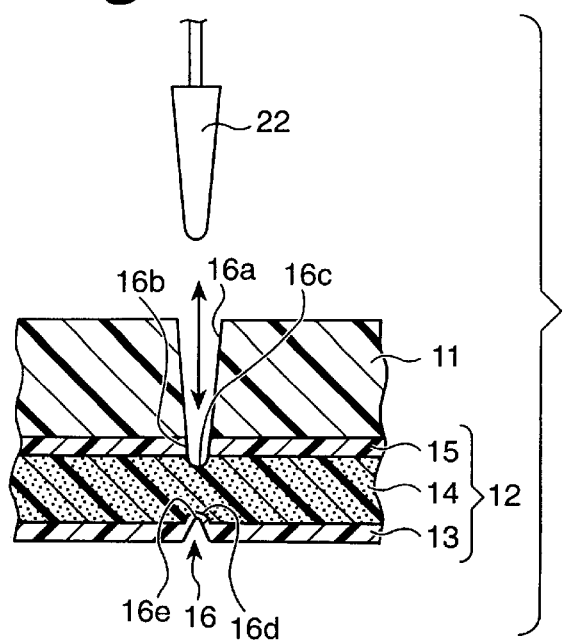

METHOD FOR MANUFACTURING AN AIR BAG COVER

This is a division of application Ser. No. 08/667,920 filed Jun. 20, 1996, now U.S. Pat. No. 5,698,283.

BACKGROUND OF THE INVENTION

1. Field of the Invention

The present invention relates to an air bag cover made of synthetic resin which can be used to cover a folded air bag of an air bag device in an instrument panel, a door trim, a seat back, or a steering wheel of an automobile and manufacturing method thereof.

2. Description of the Prior Art

Conventionally, an air bag cover comprises a synthetic resin core member and a decorative sheet disposed on the front surface of the core member (see Japanese Utility Model Publication No. Sho. 63-22262 for example).

The conventional air bag cover includes a breakable portion which, when the air bag is expanded, can be easily broken to allow the expanding air bag to project outwardly. This breakable portion is produced by forming a recessed portion in the air bag cover by means of high frequency, heat, or supersonic waves (see Japanese Patent Publications Nos. Hei. 2-248238, 4-151345, 6-218811 for example).

When the recessed portion is formed on the side of the air bag cover visible to a passenger of an automobile, the design quality of the air bag cover is lowered. For this reason, the recessed portion is conventionally formed on a back side of the air bag cover. Yet, in order to allow the air bag cover to break smoothly, the decorative sheet must also be provided with a recessed portion.

Conventionally, the decorative sheet is formed by superimposing three layers one on top of another into a united body, including an outer layer made of soft vinyl chloride or the like, a barrier layer made of polypropylene used to protect the outer layer from the heat and pressure associated with forming the core member, and a foaming layer made of foaming polypropylene, urethane or the like interposed between the outer layer and barrier layer. To allow the air bag cover to break smoothly, the conventional decorative sheet provides a recessed portion not only in the barrier layer but also in the back side of the outer layer.

However, the thickness of the outer layer is small, on the order of 1 mm, and, therefore, it is difficult to control the thickness of the outer layer when the recessed portion is formed. The thickness is even more difficult to control when the air bag cover is formed to have a curved surface and the breakable portion is formed in the curved surface.

Moreover, because the outer layer is made of soft vinyl chloride, the outer layer can become brittle at low temperatures, raising a fear that small fragments of the outer layer will be projected when the air bag deploys. This problem makes it necessary to strongly bond the outer layer to the foaming layer by adhesive.

SUMMARY OF THE INVENTION

The present invention aims at eliminating the aforementioned problems found in conventional air bag covers. Accordingly, it is an object of the invention to provide an air bag cover and manufacturing method in which a breakable portion can be formed easily therein even in the cover having a decorative sheet disposed on a core member.

It is another object of the invention to provide an air bag cover and manufacturing method which can reduce a breaking load as well as prevent the outer layer from being projected from the cover when the breakable portion is broken at low temperatures.

According to a first aspect of the present invention, an air bag cover for covering an air bag comprises: a decorative sheet having a barrier layer and an outer layer disposed on the barrier layer; and a core member made of thermoplastic resin formed by injection molding, the core member being thermally fused with the barrier layer. The barrier protects the outer layer during injection molding. A recess providing a breakable portion to be broken at the expansion of the air bag is formed in the barrier layer and the core member either intermittently or continuously along the portion of the cover to be broken.

In the aforementioned air bag cover, a second recess may be also formed in the outer layer. Further, the decorative sheet may comprise a foaming layer interposed between the outer layer and the barrier layer.

The second recess is defined by a curved portion having a substantially V-shaped section extended into the foaming layer.

Alternatively, a plurality of pin holes or slits can be formed so as to penetrate the outer layer and act in a similar manner as the second recess.

The method for manufacturing the foregoing air bag cover comprises the steps of: providing a decorative sheet having an outer layer; heating the decorative sheet; vacuum molding the heated decorative sheet into a given shape such that a recess is formed in the outer layer; disposing a core member on the decorative sheet; and forming a second recess in the core member corresponding to the recess in the outer layer.

According to the invention, even when no recess is formed in the outer layer, the outer layer can be broken smoothly as the result of the breakage of the barrier layer because the barrier layer is higher in tensile strength than the outer layer. Of course, if a recess is formed in the outer layer as well, the outer layer can be broken more smoothly.

Further, in the air bag cover according to the invention, the core member is formed by injection molding thermoplastic resin capable of thermally fusing with the barrier layer. As such, the core member can be manufactured easily without adhesive or the like. More particularly, the decorative sheet is just inserted into a set of molding dies for injection molding the core member and, after the molding dies are fastened, thermoplastic resin is charged into the cavities thereof.

By the foregoing arrangement, the outer layer of the decorative sheet is protected by the barrier layer, and thus, damage to the outer layer by heat and pressure generated by the injection molding can be prevented when the core member is injection molded.

Further, since the air bag cover can be manufactured by simply setting the decorative sheet in the core member injection molding dies, different sized air bag covers can be manufactured easily by simply increasing the size of the injection molding dies.

Moreover, because the core member is made of thermoplastic resin the molding cycle of the present air bag cover is shorter, the present air bag cover can be manufactured more efficiently, and the need for an extra member to provide rigidity is eliminated as compared with an air bag cover which is formed of urethane or the like.

In addition, if a foaming layer is interposed between the outer layer and barrier layer, the touch of the air bag cover can be improved.

In a second aspect of the invention, a fixed portion of the decorative sheet is formed, for example, by pressing a working blade of a supersonic welder, a high frequency welder or the like against the decorative sheet slowly from the back surface thereof. The barrier layer is then heated and softened and, at the same time, the foaming layer can be depleted by the welder such that the barrier layer is reduced in thickness and is welded to the outer layer. In this welding operation, even if the back side of the outer layer is recessed and is thereby reduced in thickness, the welding operation may be performed to such a degree that can secure the thickness of the outer layer to a specific level. Therefore, the thickness control according to the invention can be simplified remarkably over the conventional thickness control.

Further, the need to control thickness can be eliminated by forming pin holes or slits in the outer layer. It is not necessary to form any recessed portion in the outer layer because of the pin holes or slits formed in the outer layer. This makes it possible to produce the breakable portion easily without carrying out any controlling operation on the thickness of the outer layer.

BRIEF DESCRIPTION OF THE DRAWINGS

FIGS. 4(a) to 4(c) are explanatory views of a process for manufacturing the air bag cover according to the first embodiment;

DETAILED DESCRIPTION OF THE PREFERRED EMBODIMENTS

Description of the presently preferred embodiments will be given below with reference to the accompanying drawings.

1st Embodiment

Figure 1:
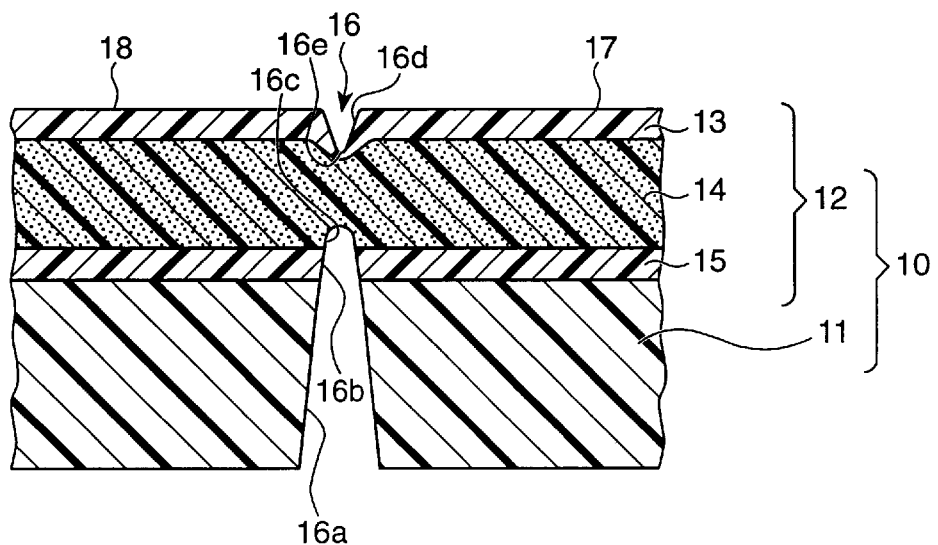
FIG. 1 is an enlarged sectional view of an air bag cover according to a first embodiment of the invention.
Figure 2:
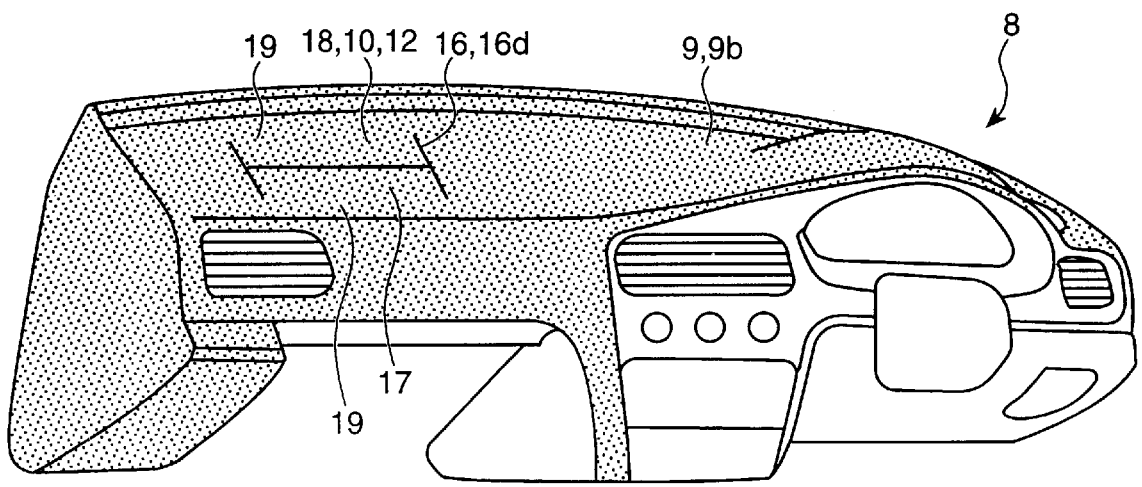
FIG. 2 is a perspective view of the air bag cover according to the first embodiment.
Figure 3:
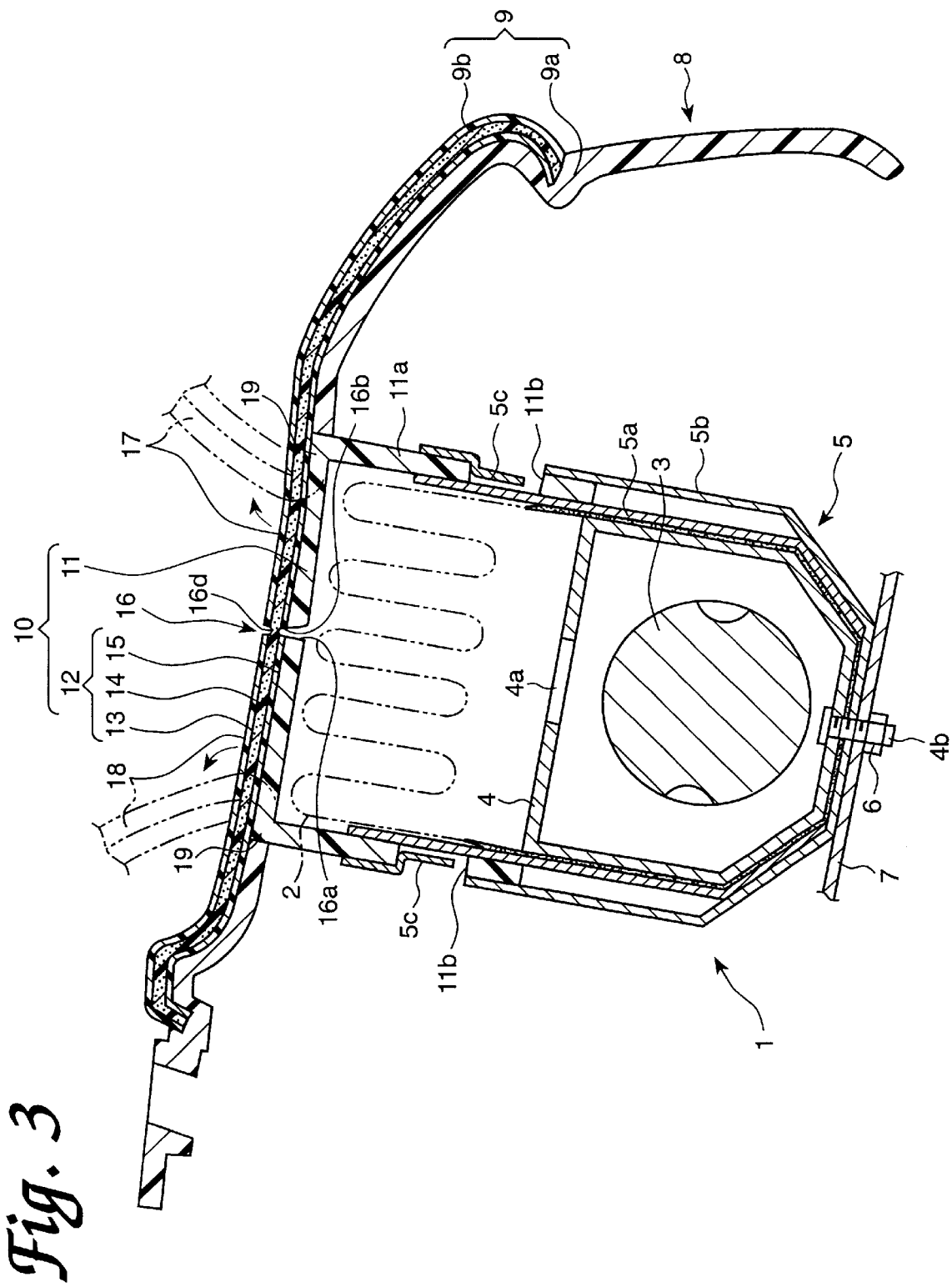
FIG. 3 is a sectional view of the air bag cover according to the first embodiment.

An air bag cover 10 according to a first embodiment, as shown in FIGS. 1 to 3, is formed as a part of an instrument panel 8 of a car. The instrument panel 8 comprises a main body 9 and the air bag cover 10.

The main body 9 includes a base member 9a made of hard synthetic resin, such as polypropylene containing filler, and a main body decorative sheet 9b. The main body decorative sheet 9b is preferably formed by extending a decorative sheet 12, which covers the air bag cover 10, (discussed below) disposed on the base member 9a.

The air bag cover 10 is disposed in the instrument panel 8 so that it covers the upper portion of the folded air bag 2 of the air bag device 1, and it includes a core member 11 and the decorative sheet 12 disposed on the surface side of the core member 11.

In the above construction, the base member 9a of the main body 9 is made of hard synthetic resin which have larger hardness than that of the core member 11.

Referring now to the air bag device 1 as shown in FIG. 3, the air bag device 1 includes a bag-shaped air bag 2 which can be folded and stored, a cylinder-type inflator 3 which is used to expand the air bag 2, a cylindrical diffuser 4 which diffuses the gas from the inflator 3 and allows the gas to flow into the air bag 2, and a case 5 which covers the peripheries of the air bag 2, inflator 3 and diffuser 4.

Reference character 4a designates a gas flow hole for diffusing the gas from the inflator 3, while 4b designates a plurality of bolts which are provided on and projected from the diffuser 4. When the bolts 4b are fastened by nuts 6, the bolts 4b can connect the case 5, air bag 2 and diffuser 4 together into a united body and also can mount and fix the air bag device 1 to a bracket 7 which is provided on and projected from a frame of a car.

The case 5 includes a side wall portion which is formed as a double structure including an inner panel 5a and an outer panel 5b. In the outer panel 5b, there are a predetermined number of claws 5c which are formed by raising up the corresponding portions of the outer panel 5b and extending them toward the inner panel 5a. These claws 5c are used to secure a bracket 11a which will be described later.

The air bag cover 10 includes a breakable portion 16 having an H-shape as viewed from above. When the air bag 2 is expanded, door portions 17 and 18 pivot open due to breakage of the breakable portion 16. The portions of the air bag cover 10 existing between the upper and lower portions of the H-shape of the breakable portion 16 provide hinge portions 19 which are used as the centers of rotation of the door portions 17 and 18.

The core member 11 is made of thermoplastic elastomer compatible with the base member 9a, that is, capable of thermally fusing with the base member 9a. This compatibility assures that the hinge portions 19 are not broken but rather bend during air bag deployment. It also allows the core member 11 to be connected to the base member 9a. In the present embodiment, the base member 9a is made of polypropylene containing filler. The suitable materials for the core member 11 include olefin thermoplastic elastomer and styrene thermoplastic elastomer. In the present embodiment, the core member 11 is made of olefin thermoplastic elastomer.

The core member 11 includes a bracket 11a having a square cylindrical shape such that it is projected from the back side of an outer peripheral edge of the core member 11. In the bracket 11a, there are formed a predetermined number of mounting holes 11b in which the claws 5c of the case 5 of the air bag device 1 can be inserted and secured. The bracket 11a assures that the breakable portion 16 and door portions 17, 18 are accurately located above the folded air bag 2.

The decorative sheet 12 includes an outer layer 13, a barrier layer 15 which is disposed as the inner most layer of the decorative sheet 12, and a foaming layer 14 interposed between the outer layer 13 and barrier layer 15. The barrier layer 15 protects the outer layer 13 and the foaming layer 14 from heat and pressure when the core member 11 is molded.

In the present embodiment, the outer layer 13 and barrier layer 15 are made of the same olefin thermoplastic elastomer as the core member 11, and the foaming layer 14 is made of foaming polypropylene. The respective thicknesses of the outer layer 13, barrier layer 15 and foaming layer 14 are 0.5 mm, 0.7 mm and 3.0 mm respectively.

In the portion of the air bag cover 10 that corresponds to the breakable portion 16, a recessed portion 16a is formed in the core member 11 and a cut portion 16b is formed in the barrier layer 15 such that the core member 11 and the barrier layer 15 define a recess. Preferably, the recess extends into the foaming layer. There is also provided a curved portion 16d with a substantially V-shaped recess in the outer layer 13. A thin portion 16e of the V-shaped recess is formed by extending the outer layer 13 by force from the surface side thereof to the back side thereof.

The curved portion 16d providing the recess in the outer layer 13 is formed so as to extend continuously along the H-shape of the breakable portion 16, while the recessed portions 16a and 16c may be formed continuously or intermittently along the H-shape of the breakable portion 16.

In the present embodiment, the thickness of the thin portion 16e, which has the smallest thickness in the curved portion 16d, is 0.3 mm.

Referring now to the manufacture of the present air bag cover 10 and instrument panel 8 as shown in FIG. 4, the decorative sheet 12 including the main body decorative sheet 9b, as shown in FIG. 4(a), is first heated and softened by a heating device 20 and, thereafter, as shown in FIG. 4(b), the softened decorative sheet 12 is pressed against a vacuum mold 21 and is thereby vacuum molded into a given shape such as the instrument panel 8. In this molding operation, the outer layer 13 is pushed and extended by a projection 21b provided on the mold surface 21a of the vacuum mold 21 so that the curved portion 16d including the thin portion 16e serving as the breakable portion can be formed in the outer layer 13. By this process, the thin portion 16e is extended into the foaming layer 14.

Next, the decorative sheets 12 and 9b, which have been formed into a given shape as a whole, are disposed in a mold for injection molding the base member 9a of the main body 9. This assembly is set in a mold for injection molding the core member 11 of the air bag cover 10 and, as shown in FIG. 4(c), the core member 11 is then injection molded onto the decorative sheet 12.

After the above-molded assembly is released from the mold, as shown in FIG. 4(d), the recessed portions 16a and 16c are formed by a working hone 22 of a supersonic welder. A mounting hole 11b is formed in the core member 11.

By the foregoing method, the curved portion 16d defining the substantially V-shaped recess and the thin portion 16e are provided in the breakable portion of the outer layer 13. According to the present method, since the curved portion 16d defining the substantially V-shaped recess is formed by vacuum molding, the decorative sheet 12 including the outer layer 13 has been already heated and softened. Thus, without being broken, the outer layer 13 can be pushed and extended from the surface side thereof to the back side thereof so that the curved portion 16d can be formed in the outer layer. Due to the fact that the curved portion 16d is formed by pushing and extending the outer layer 13, the thin portion 16e can be easily produced in the central portion of the curved portion 16d even when the outer layer 13 is thin. Moreover, the thin portion 16e can be formed in a curved section of the air bag cover 10 by the foregoing method.

Also, since the curved portion 16d is recessed, any difference in the luster or die portion of the portion 16d are hard to see from the surface side of the air bag cover 10, which prevents the outer appearance of the air bag cover 10 from being impaired.

Since portions of the barrier layer 15 corresponding to the base member 9a, core member 11, and decorative sheets 9b and 12 are made of the same or compatible materials as the core member 11, they can be strongly connected to each other even if adhesives are not used.

Alternatively, the recessed portion 16a, 16c may also be formed by a heated cutter or a high frequency cutter.

To connect the air bag device 1 to the instrument panel 8, the bracket 11a is inserted between the inner panel 5a and outer panel 5b of the case 5 of the air bag device 1 and is attached by the bolts 4b. The claws 5c are respectively inserted into and secured to the mounting holes 11b. If the bracket 7 is fastened to the bolts 4b by the nuts 6 and the other end of the bracket 7 is fixed to a frame (not shown), then the air bag device 1 can be connected with the instrument panel 8 and can be then mounted in the automobile together with the instrument panel 8. Preselected meters and other similar parts can be installed in the automobile when the instrument panel 8 is mounted into the automobile.

When gas is discharged from the inflator 3, gas flows through a gas flow hole 4a of the diffuser 4 into the air bag 2, so that the air bag 2 pushes against the air bag cover 10. In this operation, a tensile load is applied to the air bag cover 10. Stresses concentrate in the recessed portion 16a provided on the back side of the breakable portion 16. Therefore, stresses easily concentrate in the thin portion 16e of the curved portion 16d which causes the section shape of the outer layer 13 to vary, with the result that the breakable portions 16 (16a, 16b, 16e) can be broken. In this manner, the air bag 2 allows the breakable portion 16 of the air bag cover 10 to break and also allows the door portions 17 and 18 to open or rotate with the hinge portions 19 of the air bag cover 10, so that the air bag can be deployed from the instrument panel 8.

2nd Embodiment

Figure 5:
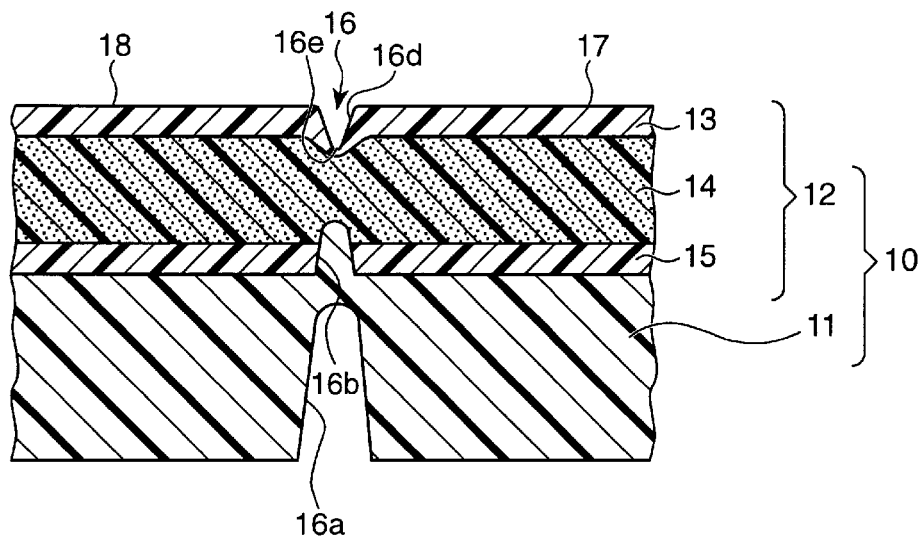
FIG. 5 is an enlarged sectional view of an air bag cover according to a second embodiment.

FIG. 5 shows a sectional view of an air bag cover 10 according to second embodiment of the present invention.

The air bag cover 10 of the second embodiment is different from that of the first embodiment. The recessed portion 16a of the core member 11 does not extend through to the surface side of the core member 11. Rather, the core member 11 protrudes into the barrier layer 15 and the foaming layer 14.

Figure 6A:
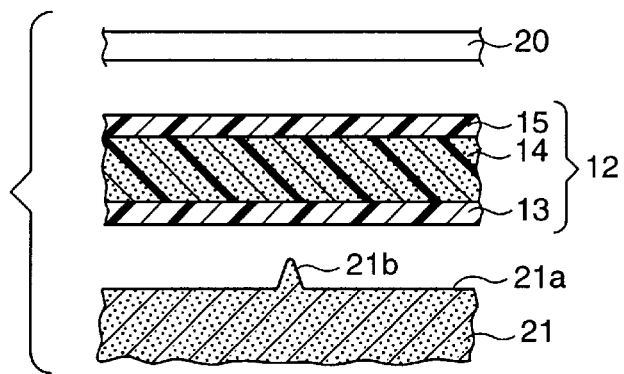
FIGS. 6(a) to 6(c) are explanatory views of a process for manufacturing the air bag cover according the second embodiment.
Figure 6B:
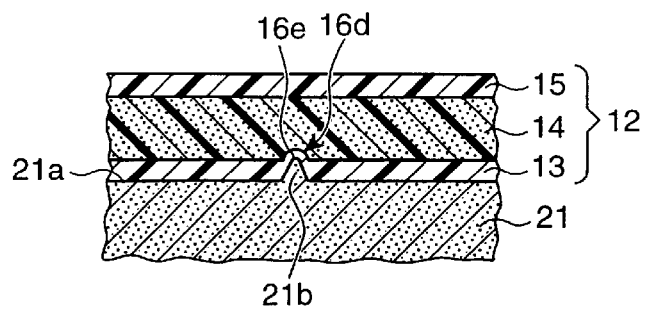
Figure 6C:
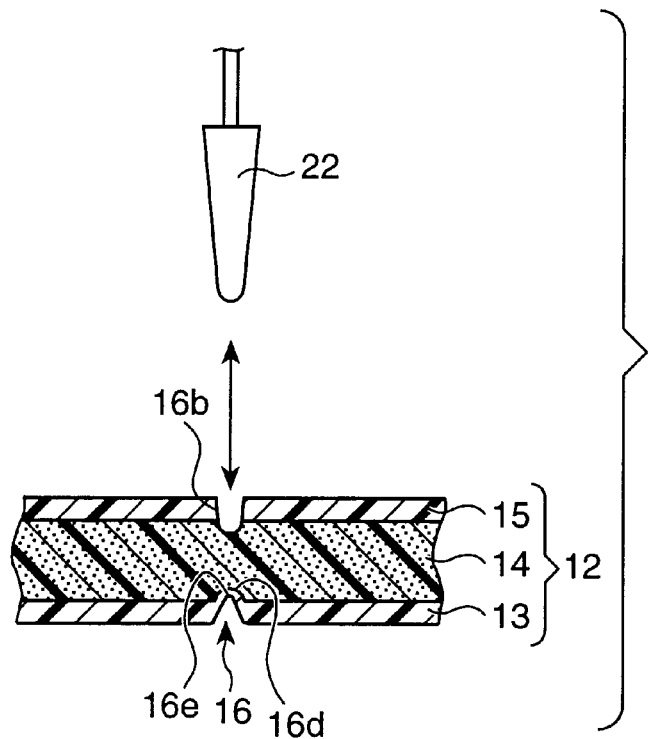

As shown in FIGS. 6(a) and 6(b), the process for forming the curved portion 16d is exactly the same as that of the first embodiment shown in FIGS. 4(a) and 4(b). As shown in FIG. 6(c), the recess 16 is formed by a working hone 22 of a supersonic welder in the barrier layer 15 before molding the core member.

The decorative sheets 12 and 9b, which have been molded into a given shape as a whole, are set into a mold for injection molding the base member 9a of the instrument panel 9. After molding the base member 9a, the molded assembly is set into a mold for injection molding the core member 11 of the air bag cover 10, and the core member 11 is then injection molded. It may be assumed that since the recess portion 16b is provided in the barrier layer 15, that the foam layer 14 and outer layer 13 can be damaged due to heat and injection pressure generated when the core member 11 is injection molded. However, since recess 16b is formed with a narrow width (in the range of 0.1–0.5 mm), the foaming layer 14 and outer layer 13 cannot be damaged to such a degree that has an ill effect on the outer surface of the decorative sheet 12.

The recessed portion 16a is formed by a projecting portion previously provided in the mold surface of the mold for the core member 11. The projecting portion forms the recessed portion 16a and pushes the core member 11 into the recess 16b, as shown in FIG. 5.

For the purpose of comparing the present embodiment with a comparison case, breaking comparison tests were conducted and the results of the tests are as follows. In the tests, the thickness of the thin portion 16e of the outer layer 13 was varied. Test pieces having a JIS No. 2 dumbbell shape were formed of only two layers, the outer layer 13 and foaming layer 14 of the decorative sheet 12 exclusive of the barrier layer, and the test pieces were pulled at a speed of 200 mm/min. by an autograph tension tester at room temperature (23° C.).

TABLE 1

| | Thickness of Thin Portion 16e (mm) | Breaking Load (N/10 mm) |
|---|---|---|
| Embodiment 1 | 0.15 | 27 |
| Embodiment 2 | 0.25 | 31 |
| Embodiment 3 | 0.30 | 53 |
| Comparison 1 | 0.15 | 36 |
| Comparison 2 | 0.20 | 59 |
| Comparison 3 | 0.25 | 78 |
| Comparison 4 | 0.30 | 79 |

As shown in Table 1, the tension tests show that the structure of the air bag cover according to the present embodiment is able to reduce the breaking load even if the thin portion 16e of the outer layer 13 is increased.

Tension comparison tests were also conducted on only the outer layer 13, and the test results are as follows. In the tension comparison tests, as sheets which do not include the thin portion 16e and have a uniform thickness of 0.7 mm, there were prepared an outer layer (TPO layer) made of olefin thermoplastic elastomer according to the present embodiment and an outer layer (PVC layer) made of soft vinyl chloride. They were formed into test pieces each having a JIS No. 2 dumbbell shape, and the test pieces were pulled at a speed of 200 mm/min. by a tension tester in a constant temperature oven.

TABLE 2

| | Test Condition | Breaking Load (N/mm) | Breaking Extension (%) | Thickness of Outer Layer (mm) |
|---|---|---|---|---|
| TPO Layer | Low Temp. (−30° C.) | 164.2 | 240 | 0.7 |
| | Room Temp. (23° C.) | 85.5 | 630 | 0.7 |
| PVC Layer | Low Temp. (−30° C.) | 292.6 | 35 | 0.7 |
| | Room Temp. (23° C.) | 152.0 | 280 | 0.7 |

As can be seen from Table 2, the air bag cover according to the present embodiment can be broken without lowering the breaking extension thereof so greatly and is not embrittled even at a low temperature of −30° C. Therefore, it can be understood that, even if the outer layer 13 is simply connected to the foaming layer 14 by thermal fusion or the like, the outer layer 13 can be prevented from being projected when the air bag cover is broken at low temperatures.

Therefore, as can be seen from the test results above, since the outer layer 13 is made of olefin thermoplastic elastomer, the breaking load can be reduced without lowering the productivity of the air bag cover (that is, without any need to reduce the thickness of the outer layer 13 which would increase the rate of occurrence of defective products and would make the thickness control strict). Also, by means of simple connection means such as thermal fusion or the like, the outer layer 13 can be prevented from being projected when it is broken at low temperatures.

3rd Embodiment

Figure 7:
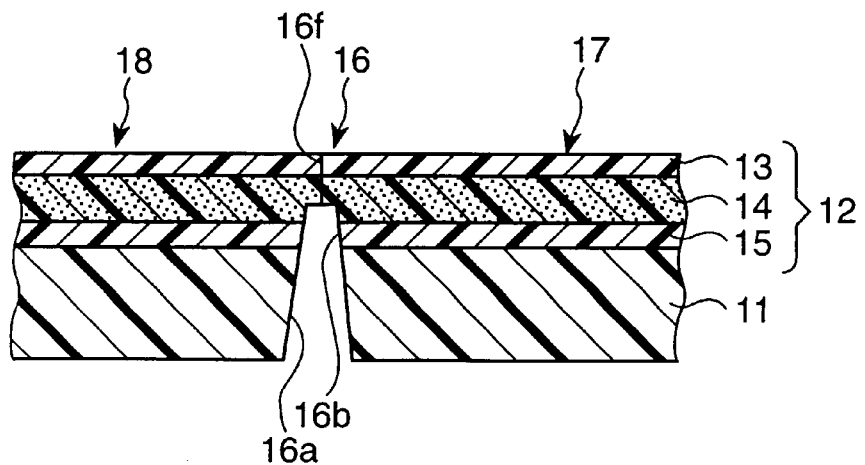
FIG. 7 is a sectional view of an air bag cover according to a third embodiment.

In the above embodiments, as a part of the breakable portion 16 to be provided in the outer layer 13, there is shown a structure in which the thin portion 16e is formed in the curved portion 16d. However, this is not limiting but, as in an air bag cover 10 shown in FIG. 7, an alternative breakable portion 16 of the outer layer 13 can be formed by pin holes or slits 16f.

Figure 8A:
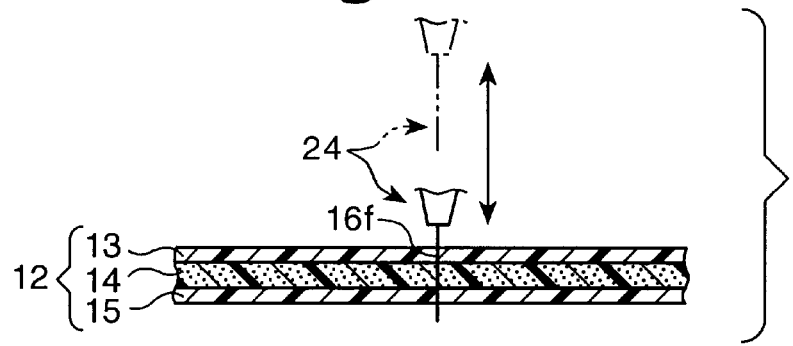
FIGS. 8(a) to 8(c) are explanatory views of a process for manufacturing the air bag cover according to the third embodiment.
Figure 8B:
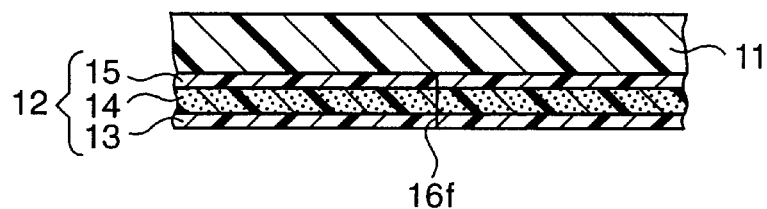
Figure 8C:
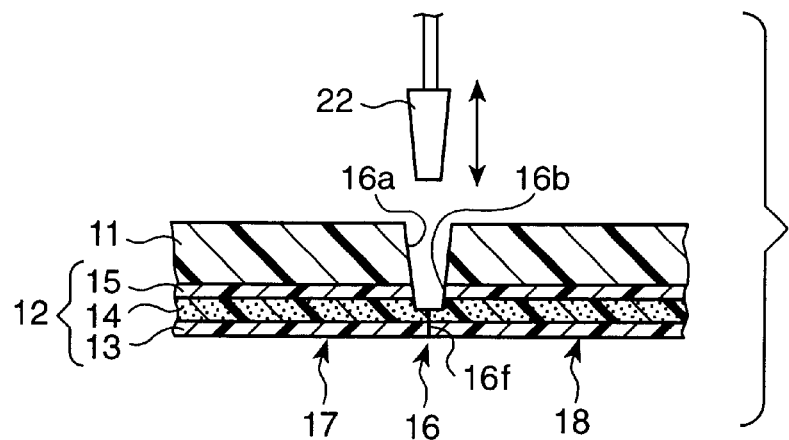

The breakable portion 16 can be manufactured in the following manner. As shown in FIG. 8(a), after the decorative sheets 12 and 9b are formed by vacuum molding into a given shape, a large number of pins or cutters 24 are inserted into the decorative sheets 12 and 9b at their respective positions to thereby form the pin holes or slits 16f intermittently. Thereafter, the decorative sheets 12 and 9a are set into a mold for injection molding the base member 9a of the instrument panel 9, and the base member 9a is then molded. As shown in FIG. 8(a), the molded assembly is then set into a mold for injection molding the core member 11, and the core member 11 is then injection molded. Next, as shown in FIG. 8(c), by a working hone 25 of a supersonic welder, the cut portion 16b and the recessed portion 16a are formed in the core member 11 and barrier layer 15 continuously or intermittently along the breakable portion 16, so that the breakable portion 16 can be produced.

The air bag cover 10 of this embodiment can also provide similar operation and effects to those that are provided by the previous embodiments.

4th Embodiment

Figure 9:
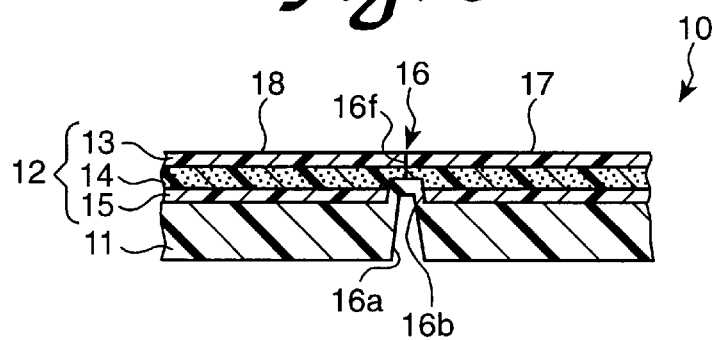
FIG. 9 is a sectional view of an air bag cover according to a fourth embodiment.

It is also possible to produce an air bag cover 10 as shown in FIG. 9.

In the air bag cover 10, after the pin holes or slits 16f are formed in their respective positions of the decorative sheet 12 by the pins or cutters 24, a cut portion 16b is formed in the barrier layer 15, and a recessed portion 16a is formed in the core member 11 by the mold surface of the core member injection mold when the core member 11 is injection molded or by a working jig after the core member 11 is injection molded to thereby produce the breakable portion 16. The air bag cover 10 of this embodiment also provides similar operation and effects to those that are provided by the previous embodiments.

5th Embodiment

Figure 10:
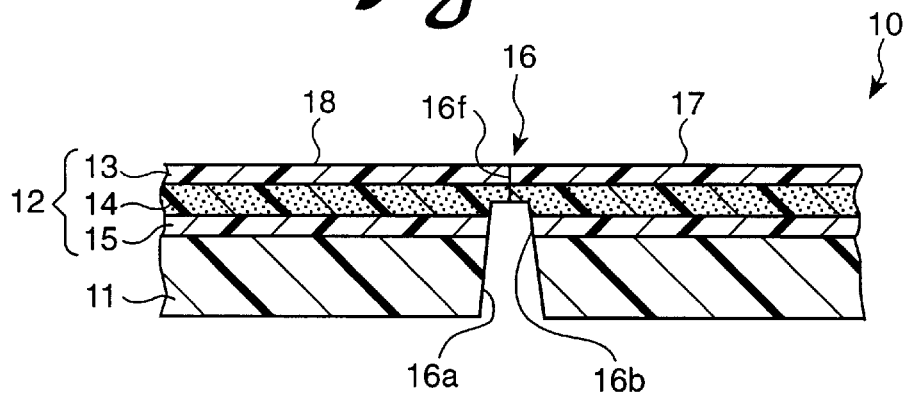
FIG. 10 is an enlarged sectional view of an air bag cover according to a fifth embodiment.

In the respective air bag covers 10 according to the third and fourth embodiments, the pin holes or slits 16f are formed in such a manner that they penetrate the air bag covers up to the portion thereof corresponding to the recessed portion 16a formed in the foaming layer 14. However, the invention is not limited to this but, like an air bag cover 10 according to a fifth embodiment shown in FIG. 10, the pin holes or slits 16c may be formed in such a manner that they penetrate to the middle portion of the foaming layer 14. Since the foaming layer 14 itself is easy to break, there is no possibility that the presence or absence of the pin holes or slits 16f in the forming layer 14 has an influence on the breakage of the decorative sheet 12.

6th Embodiment

Figure 11:
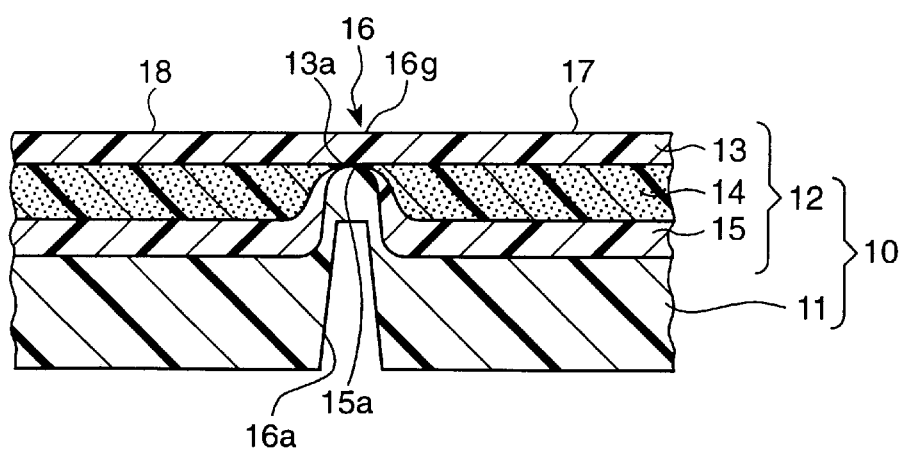
FIG. 11 is an enlarged sectional view of an air bag cover according to a sixth embodiment.

FIG. 11 shows an air bag cover 10 according to a sixth embodiment of the present invention. A recessed portion 16a is formed in the core member 11. In the decorative sheet 12, a fixed portion 16g is formed by extending and fixing the barrier layer 15 to the outer layer 13 by force.

Due to provision of the fixed portion 16b in the decorative sheet 12, the barrier layer 15 is reduced in thickness to provide a thin portion 15a. The thickness of the thin portion 15a is approximately 0.1 to 0.3 mm. If the thickness of the thin portion 15a is less than 0.1 mm, then there is produced a fear that the thin portion 15a can be broken when it is formed. On the other hand, if the thickness is more than 0.3 mm, then the breaking strength of the thin portion 15a becomes large, which in turn lowers the developing property of the cover 10.

Figure 12A:
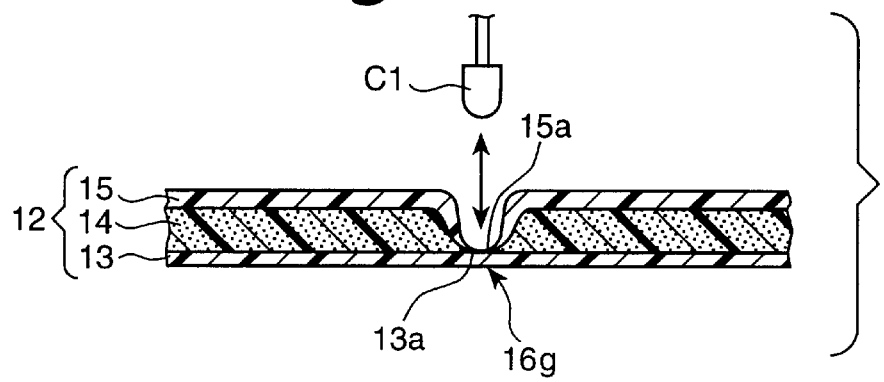
FIGS. 12(a) to 12(c) are explanatory views of a process for manufacturing the air bag cover according to the sixth embodiment.

The method of manufacturing the present embodiment is as follows. As shown in FIG. 12, the decorative sheet 12 including the main body decorative sheet 9b is first vacuum formed into a given shape which can be embedded in the instrument panel 8 and, thereafter, as shown in FIG. 12(a), a working blade C1 of a supersonic welder is pressed against the decorative sheet 12 from the back side thereof thereby forming the fixed portion 16g. In this operation, in order to prevent the barrier layer 15 from being fused and cut away, the working blade C1 is pressed against the barrier layer 15 with a pressure on the order of 200 KPa and at a slow lowering speed on the order of 50 mm/min. Therefore, the barrier layer 15 can be heated and softened and the foaming layer 14 is dissipated thereby providing the thin portion 15a in the barrier layer 15, and the thin portion 15a is welded to the outer layer 13. The welded portion is then cooled in this condition, and the fixed portion 16g is easily formed.

The decorative sheets 12 and 9b, which are respectively formed in their given shapes and also include the above-formed fixed portion 16g, are set in a mold which are used to injection mold the base member 9a of the instrument panel main body 9, and the base member 9a is then molded.

Figure 12B:
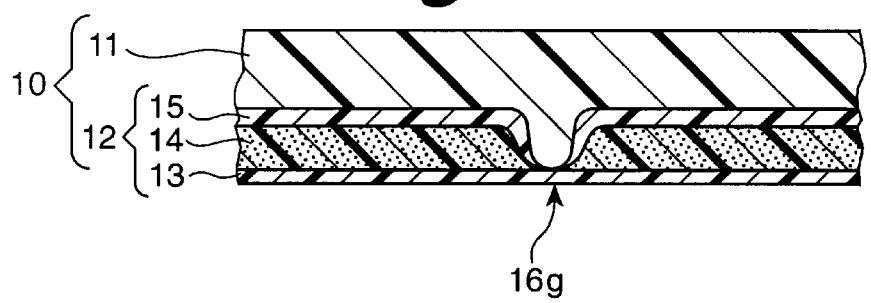

Thereafter, the decorative sheets 12 and 9b are set in an injection mold for molding the core member 11 of the air bag cover 10 and, as shown in FIG. 12(b), the core member 11 is then molded.

Figure 12C:
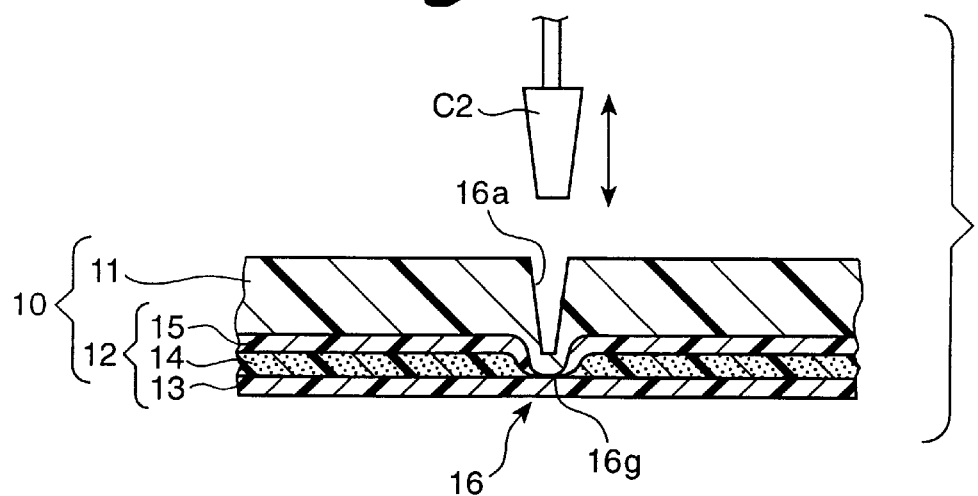

After the above molded air bag cover 10 is released from the injection mold, as shown in FIG. 12(c), the recessed portion 16a is formed by a working blade C2 of a supersonic welder and mounting holes 11b are formed in the bracket 11a.

Figure 13:
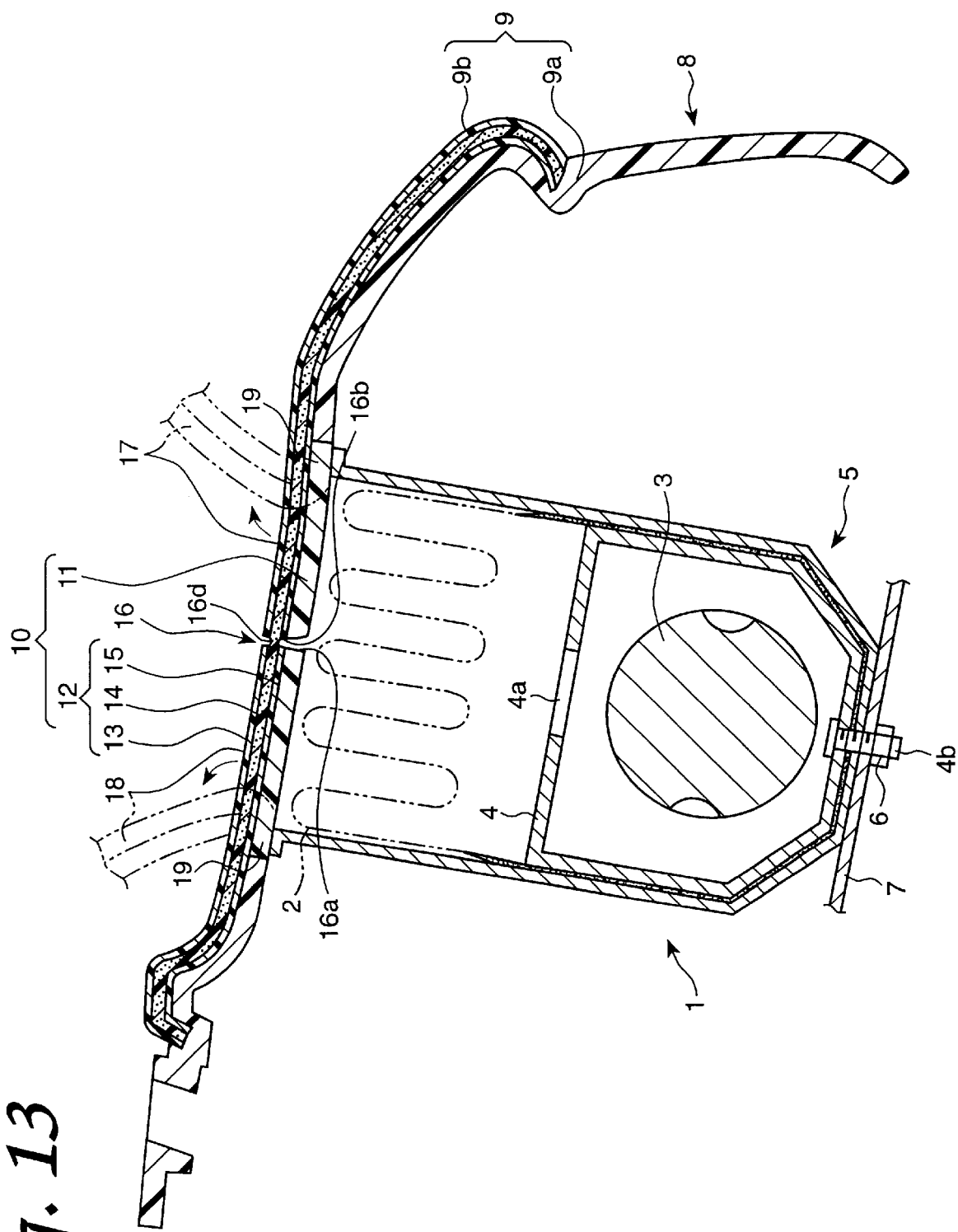
FIG. 13 is a sectional view of a further modification of the air bag cover according to the above embodiments.

In order to accurately dispose the breakable portion 16 and door portions 17 and 18 above the folded air bag 2, the bracket 11a to be connected to the case 5 of the air bag device 1 is provided in the core member 11. However, this feature is not limiting. Provided that the air bag cover 10 is located above the air bag 2, like an air bag cover 10 shown in FIG. 13, the bracket to be connected with the case 5 can be omitted. In the air bag cover according to the first and second embodiments, even if the curved portion 16d is not provided in the outer layer 13, in view of the fact that the barrier layer 15 is higher in tensile strength than the outer layer 13, if the cut portion 16b is spread out in such a manner that the barrier layer 15 can be broken, then the outer layer 13 can be broken smoothly as the barrier layer 15 is broken. Of course, if the curved portion 16d is provided in the outer layer 13 as well, then the outer layer 13 can be broken more smoothly.

Also, in the air bag cover according to the present embodiments, the core member 11 disposed on the back side of the air bag cover is made of thermoplastic elastomer by injection molding which can be thermally fused to the barrier layer 15. That is, the core member 11 can be manufactured easily without using an adhesive.

Therefore, the air bag cover 10 according to the invention can provide not only a remarkable design effect but also an excellent touch. The air bag cover 10 can be manufactured easily and, when the air bag 2 is expanded, the air bag cover 10 can be broken smoothly so that the air bag 2 can be deployed.

Further, since the outer layer 13, barrier layer 15 and core member 11 are made of olefin thermoplastic elastomer, the foaming layer 14 is made of foaming polypropylene, and the base member 9a is made of polypropylene containing filler, it can be recycled and thus resources can be saved.

Further, according to the invention, there is also available an air bag cover which includes a decorative sheet having a two layer structure rather than a three-layer structure. Specifically, the decorative sheet 12 does not include a foaming layer and only includes the outer layer 13 made of olefin thermoplastic elastomer and the barrier layer 15 made of olefin thermoplastic elastomer or styrene thermoplastic elastomer. The outer layer 13 and barrier layer 15 are thermally fused to each other.

The invention is not limited to use in an instrument panel. The invention can also be applied to the pads of car interior parts such as a door trim, a seat back, a steering wheel and the like which are used to cover the air bag of the air bag device. When the invention is used in the car interior parts, the air bag cover may be made of polypropylene system material and the main bodies of the car interior parts such as the instrument panel 9 and the like except for the air bag cover portion thereof may be made of polypropylene containing filler or the like, so that they can be recycled.

What is claimed is:

1. A method of manufacturing an air bag cover comprising the steps of:

providing a decorative sheet having an outer layer and a barrier layer, wherein the barrier layer is higher in tensile strength than the outer layer;

heating the decorative sheet;

vacuum molding the heated decorative sheet into a given shape such that a first recess is formed in the outer layer;

thermally fusing a core member to the barrier layer of the decorative sheet; and forming a second recess in the core member opposite to the first recess formed in the outer layers thereby providing a breakable portion capable of breaking upon an expansion of the air bag.

2. A method of manufacturing an air bag cover according to claim 1, wherein a foaming layer is disposed between the outer layer and the barrier layer.

3. A method of manufacturing an air bag cover according to claim 2, wherein the barrier layer is on a back side of the foaming layer.

4. A method of manufacturing an air bag cover according to claim 3, wherein the core member is disposed on a back side of the barrier layer by injection molding.

5. A method of manufacturing an air bag cover according to claim 4, where in the second recess is formed into the barrier layer.

6. A method of manufacturing an air bag cover according to claim 5, where in the second recess is formed by a working hone of a supersonic welder.

7. A method of manufacturing an air bag cover according to claim 1, wherein the heated decorative sheet is disposed on a vacuum mold having a projection on a mold surface thereof, the projection pushing and extending the outer layer to form the recess.

8. A method of manufacturing an air bag cover according to claim 6, wherein the second recess portion is formed after disposing the core member on the decorative sheet.

9. A method of manufacturing an air bag cover according to claim 6, wherein a portion of the second recess is formed in the barrier layer before disposing the core member onto the decorative sheet and wherein the remaining portion of the second recess is formed in the core member after disposing the core member onto the decorative sheet.

10. A method of manufacturing an air bag cover comprising the steps of:

forming a decorative sheet having an outer layer, a foaming layer disposed on a back side of the outer layer, and a barrier layer disposed on a back side of the foaming layer, wherein the barrier layer is higher in tensile strength than the outer layer;

heating the decorative sheet;

molding the heated decorative sheet into a given shape;

forming a plurality of pin holes or slits in the decorative sheet;

disposing a core member on a back side of the barrier layer by injection molding such that the core member is thermally fused to the barrier layer; and forming a recess in the core member and the barrier layer such that the recess in the core member and the barrier layer is opposite to the pin holes or slits thereby providing a breakable portion capable of breaking upon an expansion of the air bag.

11. A method of manufacturing an air bag cover comprising the steps of:

forming a decorative sheet having an outer layer, a foaming layer disposed on a back side of the outer layer, and a barrier layer disposed on a back side of the foaming layer, wherein the barrier layer is higher in tensile strength than the outer layer;

heating the decorative sheet;

molding the heated decorative sheet into a given shape;

welding the barrier layer to the outer layer by heating and pressing the barrier layer from the back side of the decorative sheet to form a fixed portion in the barrier layer;

disposing a core member on the back side of the barrier layer by injection molding such that the core member is thermally fused to the barrier layer; and forming a recessed portion in the core member opposite to the fixed portion thereby providing a breakable portion capable of breaking upon an expansion of the air bag.

* * * * *